United States Patent
Schoenfelder

[11] 3,951,128
[45] Apr. 20, 1976

[54] COMBINED FLAT PLATE - FOCAL POINT SOLAR HEAT COLLECTOR

[75] Inventor: James L. Schoenfelder, Iowa City, Iowa

[73] Assignee: Sun Power, Inc., Iowa City, Iowa

[22] Filed: May 10, 1974

[21] Appl. No.: 468,913

[52] U.S. Cl. ................................................. 126/271
[51] Int. Cl.² ............................................ F24J 3/02
[58] Field of Search ............. 126/271, 270; 237/1 A

[56] References Cited
UNITED STATES PATENTS

| | | | |
|---|---|---|---|
| 1,258,405 | 3/1918 | Harrison | 126/271 |
| 2,257,524 | 9/1941 | De Bogory | 126/271 |
| 2,467,885 | 4/1949 | Freund | 126/271 |
| 2,705,948 | 4/1955 | Rostock | 126/271 |
| 2,907,318 | 10/1959 | Awot | 126/271 |
| 3,227,153 | 1/1966 | Godel et al. | 126/271 |
| 3,321,012 | 5/1967 | Hervy | 126/271 X |
| 3,390,672 | 7/1968 | Snelling | 126/271 |
| 3,799,145 | 3/1974 | Butterfield | 237/1 A |

Primary Examiner—Kenneth W. Sprague
Assistant Examiner—James C. Yeung
Attorney, Agent, or Firm—Zarley, McKee, Thomte, Voorhees & Sease

[57] ABSTRACT

A solar heat collector system which is comprised of a roof or wall structure element, a conduit for heat exchange fluid in the roof or wall structure element, and a focal point reflector plate behind the conduit and in the structure element. Preferably the conduit is of a flat elliptical cross section. The flat plate-focal point collector adds an advantage of reflecting sunlight directly onto the conduit for heat exchange fluid in order to insure more efficient heat exchange between the sun rays and the fluid contained in the conduits; and the reflector directs re-radiated heat from the conduit back to the conduit.

8 Claims, 7 Drawing Figures

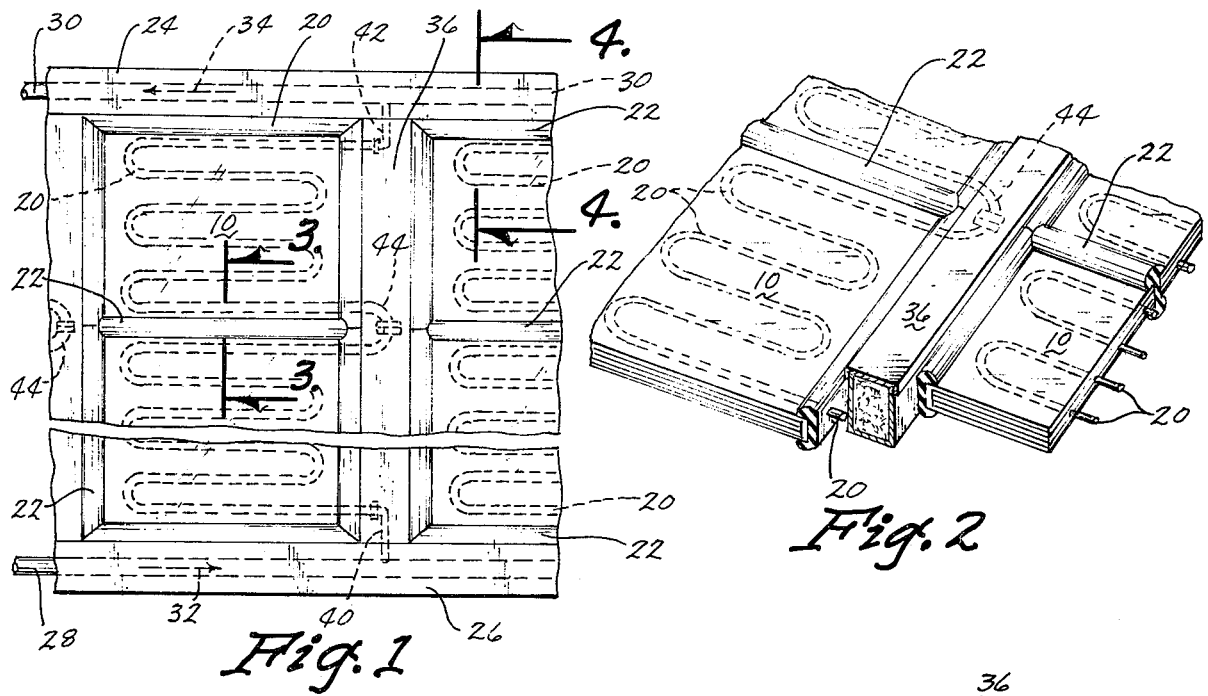
Fig. 1
Fig. 2
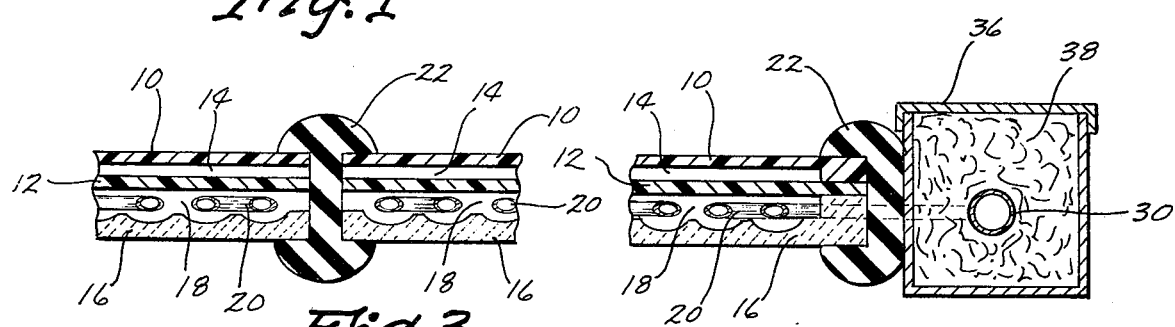
Fig. 3
Fig. 4
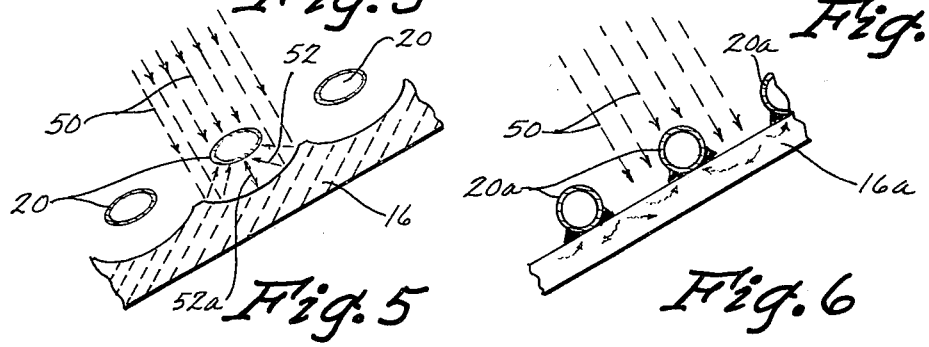
Fig. 5
Fig. 6
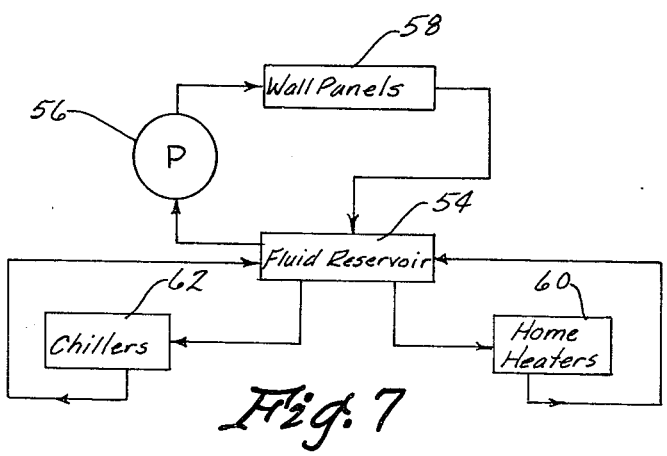
Fig. 7

COMBINED FLAT PLATE - FOCAL POINT SOLAR HEAT COLLECTOR

BACKGROUND OF THE INVENTION

Ever increasing research is presently being conducted in the area of conversion of solar energy into heat energy. The recent re-emphasis upon research in this area is probably attributed to the current interest in new sources of energy for space heating and air conditioning. Efficient and consumer acceptable solar heat collector systems which would utilize solar energy as an alternative to fossil fuels for heating represents one possible area of greatly relieving our current fossil fuel shortage.

Solar heat collector systems have heretofore been developed. Such systems generally employ a "collector plate" which is utilized to convert the solar energy into heat energy. Typically, the converted heat energy is reradiated from the collector plate and warms a fluid, either a gas or a liquid, which is then conveyed away to a remote position for storage and subsequent utilization. In such systems the fluid employed is either a gas such as air, or a liquid, typically water. Where a gaseous fluid is employed, the air surrounding a collector plate is warmed by conduction, convection and radiation of heat energy from the collector plate and is swept away by suitable means and stored for subsequent usage in the building structure.

Where liquid heat absorption fluids are utilized, a somewhat different approach has been taken. In such systems (see FIG. 6 discussed below) a collector plate is employed which has bonded thereto conduits which move the heat absorption liquid across the surface of the collector plate. The collector plate is warmed as it absorbs solar energy, and this heat energy is then conveyed by conduction to the heat absorption fluid, typically water, contained within the conduits which are bonded to the collector plate by brazing, welding or other suitable means.

Collector plate systems such as that shown in FIG. 6, provide only a minimum of heat conversion efficiency. As explained below, much of the solar energy which could be converted into heat energy is lost by systems such as shown in FIG. 6. Still, there are certain advantages to be gained which employ liquid fluid heat absorption means and therefore it would be desirable to develop a solar heat collection system which can employ liquid heat absorption fluids and which will do so at a maximum efficiency of conversion of solar energy to heat energy without the natural losses inherent in a system such as that shown in FIG. 6.

In addition, systems which employ a flat-plate collector such as that shown in FIG. 6, with fluid conduits brazed or otherwise bonded thereto, are very expensive and time-consuming to produce since the welding or brazing techinque is very time-consuming and expensive.

Another problem with prior art systems which employ flat collector plates and fluid conduits bonded thereto is the lack of such systems which can be conveniently built in small modular units which can be fitted together a a construction job site by quick and easy means without employing complicated structure. The solar heat collection system of this invention can, if desired, be built in modules or units which can quickly and efficiently be constructed at a job site with a minimum of worker skill required.

One object of this invention is to develop a solar heat collection system which employs fluid conduits which do not have to be welded, brazed, or otherwise bonded to a collector plate.

Another object of this invention is to develop a solar heat collector system which employs fluid-conveying conduits positioned such in the collector system that solar energy can be re-radiated, by reflection means, from the reflector plate to the fluid-conveying conduits and absorbed into the heat absorption fluid carried therewithin.

Yet another object of this invention is to develop a solar heat collector system which employs fluid-conveying conduits and which can be built in modular units which can quickly be constructed at a job site with a minimum of required skill and with great efficiency.

Still another object of this invention is to develop a solar heat collector system which employs a liquid heat absorption fluid means which operates at a substantially increased efficiency when compared with solar heating systems which employ conventional flat plate water collectors such as shown in FIG. 6.

The method of accomplishing these and other objects of the invention will become apparent from the following detailed description of the invention.

BRIEF DESCRIPTION OF THE DRAWINGS

FIG. 1 is a plan view, with certain parts broken away, of the solar heat collector system of this invention, as constructed of a plurality of modular units.

FIG. 2 is an elevated perspective view, with certain parts broken away, showing with more detail the construction of the solar heat collector system of this invention.

FIG. 3 is a sectioned view of FIG. 1 along line 3—3 showing in more detail the cross section of the solar heat collector system of this invention.

FIG. 4 is a sectional view of FIG. 1 along line 4—4 showing in cross section the heat collector system of this invention and the fluid inlet line to which it is connected.

FIG. 5 is a schematic illustration showing how the solar heat collector system of this invention allows re-radiated solar energy to be absorbed into the fluid-conveying conduits.

FIG. 6 is a schematic illustration showing a typical prior art flat plate collector which employs circular in cross section conduits brazed to the collector plate.

FIG. 7 is a block diagram showing the relationship of the solar heat collector system of this invention to an entire building heat and cooling system.

DETAILED DESCRIPTION OF THE INVENTION

For purposes of clarity the solar heat collector system of this invention will first be described in connection with the sectional views shown in FIGS. 3 and 4. As seen in FIG. 3, the heat collector system is comprised of a first exteriorly exposed transparent member 10, and spaced apart therefrom and behind the first exterior transparent member 10 is a second or interiorly disposed transparent member 12. Between exterior transparent member 10 and interior transparent member 12 is a first void space 14. Space 14 is filled with "dead air" or in other words, air which is not fluidly movable throughout the system. Space 14 and the air entrapped therein is provided in order to provide a dead air space which acts as an insulating barrier to prevent, or at least minimize, conductive heat loss and the attendant efficiency loss which would accompany such outward re-radiation of solar energy. Transparent members 10 and 12 can be comprised of any suitable material which will readily allow solar rays to pass therethrough. Typically, transparent members 10 and 12 are comprised of a transparent plastic material of which a preferred one is plastic acrylic material resistant to ultraviolet rays. However, it is to be understood that other transparent plastic materials could be utilized, such as, for example, ultraviolet resistant mylar. In addition, glass can be utilized, if desired. In addition, if desired, only one transparent; i.e., an exterior transparent member, can be utilized; or, alternatively, a plurality of transparent members can be utilized in generally laminar construction with an exterior transparent member, a void space, a more interiorly disposed transparent member, a second void space, and so on. However, for purposes of achieving greatest efficiency within a reasonable economic limit, it is preferred that two transparent members be provided to define a single dead air space.

Spaced apart from and behind the most interior transparent member 12 is a reflector plate 16. Reflector plate, as that phrase is utilized herein, refers to a materials sheet which is utilized to reflect solar energy. In this invention the reflector plate is a mirror reflecting surface typically covered with a highly reflective material such as that utilized on mirrors in order to insure a high incidence of sun ray reflection.

As seen in FIG. 3, the focal point reflector plate 16 is comprised of a plurality of parabolic curved surfaces, which is preferred. As explained in more detail later, these parabolic curved surfaces provide an ideal reflective surface for focusing and reflecting solar rays. The reflector plate can be comprised of any suitable metal material coated with a mirror reflecting surface, such as, for example, aluminim, steel, and other suitable alloys. In addition, if desired, the focal point reflector can be comprised of a glass or plastic material coated with a mirrow reflecting surface. However, since glass is highly frangible, it is not desirable to utilize in most situations. The parabolic curvatures of focal point reflector 16 are shown in FIG. 3 as a plurality of concave impressions on the surface of the collector plate most near interior transparent member 12. However, it is to be understood that a focal point reflector can be utilized which employs convex parabolic impressions on the most interiorly disposed surface of focal point reflector 16 to provide the same effect. Reflector plate 16 can also be a flat reflective surface. Obviously this flat configuration is less efficient than the conventional collector shown in FIG. 6 when exposed to solar radiation normal to its surface; however, at low or high sun altitudes the flat reflector configuration is more efficient than the conventional system.

A second dead air space 18 is defined by interior transparent member 12 and the spaced apart from and therebehind focal point reflector 16. Positioned within space 18 are fluid conveying conduits 20. Conduits or pipes 20 are typically made of copper, aluminum, steel or other heat absorbing alloys. In this invention it is preferred that conduits 20 are painted a dark solar ray absorbing color such as a flat black or the like. It is also preferred that conduit 20 be of a configuration which allows the conduits to substantially travel over the majority of the surface of focal point reflector 16. As seen in FIG. 2, and will be described in more detail below, it is preferred that the conduit generally be folded back upon itself in what can be described as a serpentine configuration to cover a substantial part of the reflector plate surface for maximum heat transfer efficiency. Again, for maximum heat transfer efficiency it is preferred that conduit 20 be a flat ellipse in cross section as opposed to the conventional circular cross section for most pipe or fluid conveying conduits.

The heat absorption fluid traveling through conduit 20 can be water, mineral oil, or any of the glycol heat-absorption materials such as ethylene glycol, propylene glycol, or mixtures thereof. For purposes of efficiency and in terms of a most typical operation, the heat absorption fluid will be water or mixtures thereof with glycols.

The generally laminar construction of the solar heat collection system, or modules thereof as explained below, is held in position by glazing gasket 22. Glazing gasket 22 is comprised of conventional construction material and can be of hard rubber construction, of neoprene or the like. Preferably, because it is easily bonded to the other materials, neoprene is employed.

FIG. 1 shows one method of how the entire collector system, including the plumbing circuitry, might be employed in a typical operation. There a frame for the individual modular units is shown which is comprised of a gable or ceiling board frame member 24 and a bottom frame member 26. Within bottom frame member 26 is a fluid inlet line 28 and correspondingly, within gable or ceiling board frame member 24 is a fluid outlet line 30. Directional arrows 32 and 34 indicate the flow in inlet line 28 and outlet line 30, respectively.

Periodically spaced in the solar heat collector system transverse to the gable or ceiling frame member 24 and the base or bottom frame member 26 and extending therebetween are channel frame members 36. As seen in FIG. 4, glazing gasket 22, is secured to channel frame member 36. This can be accomplished by adhesive bonding, by mechanical linkage means, or by designing a groove or channel within channel frame member 36 for glazing gasket 22 to fit therewithin. Channel frame member 36 is typically filled with insulation material 38 and as can be seen best in FIGS. 1 and 2 contains necessary conduit linkage to fluidly connect conduit 20 with outlet line 30 and inlet line 28 as depicted by linkage conduits 40 and 42. In addition, as needed, channel frame member 36 will contain a plurality of U-shaped linkage members 44 which fluidly and in a sealing relationship connect the conduits 20 of the solar heat collector system to allow heat absorption fluid to be pumped through a plurality of such units.

As can well be appreciated, the plumbing circuitry for the solar heat collector system of this invention can vary widely in terms of the precise arrangement thereof and the pattern of fluid flow therethrough. However, the important feature is that the conduits 20 be positioned in a solar heat collector system in front of a mirror reflecting focal point reflector plate 16.

Conduits 20 are held in position in the solar heat collector system by the glazing gasket 22, by the connecting lingages within channel frame member 36 at 40, 42 and 44. In addition, if desired, intermittent plastic or rubber spacers can be employed to more securely hold conduit 20 within the space between collector 16 and interiorly disposed transparent member 12.

FIGS. 5 and 6 show in one manner how the solar heat collector system of this invention represents an advantage over prior art flat plate water collectors as shown in FIG. 6.

As can be seen in FIG. 5, solar rays 50, after passing through transparent members 10 and 12, strike the concave parabolic surfaces of focal point reflector 16 or alternatively strike conduits 20. Of course those rays 50 that strike conduits 20 are immediately absorbed and converted into heat energy to heat the fluid flowing in conduit 20. Those rays which do not stike the surface of conduit 20 hit the parabolic curves of focal point reflector plate 16 and are re-radiated from the reflecting mirror surface thereof and directed to the back portion of conduits 20 as indicated at 52. In addition, heat energy radiated from conduit 20 is re-radiated back thereto by reflector 16 as depicted at 52a. This is to be contrasted with a flat plate collector as shown in FIG. 6. There the sun rays 50 hit either the conduits 20a or the collector plate 16a. To the extent that the solar rays 50 do not hit conduits 20a, the only possible way of conversion to heat energy and absorption by the fluid within conduits 20a is by conversion to heat energy in collector plate 16a and conveyance via condution back into the fluid within pipes 20a. Thus, as can be seen, a tremendous possibility for heat loss and inefficiency exists. In addition, it should be noted that in the configuration of FIG. 5 no expensive brazing, welding, or bonding need be employed. In FIG. 6, in order to have any possibility for heat conveyance via conduction, it is necessary for the conduits 20a to be brazed, welded or otherwise bonded directly to the collector plate 16a.

In actual operation the solar heat collector system of this invention operates as follows. Heat absorption fluid, typically water or a glycol-water mixture, is pumped from a fluid reservoir 54 by pump means 56 into panel inlet line 28 through linkage 40 and through the conduit 20, through linkage 44, again through another section of conduit 20, through linkae 42 and into outlet line 30 wherein it is pumped in accord with the direction shown by directional arrow 34 back to fluid reservoir 54. During this operation solar rays pass through exterior transparent member 10, with heat loss being prevented by dead air space 14, through interior transparent member 12, again with heat loss being prevented by dead air space 18, after which the solar rays either directly hit conduits 20 or the reflecting mirror surface of focal point collector 16. Conduit 20, since it is of a heat absorbing material, and typically painted black in color, absorbs the solar energy and converts it to heat energy which is transferred to the fluid running within pipes or conduits 20. The fluid is continually circulated via pump 56 through fluid reservoir 54, through wall panels 58, and back into fluid reservoir 54 until the temperature therein is gradually raised. In accord with the invention, the temperature of the heat absorption fluid can typically be raised within the temperature range of from about 180° F. to about 210° F. This is significant because with most conventional prior art flat plate collectors, temperatures in excess of 180° F. are inefficiently achieved. Once the temperature of the fluid within fluid reservoir 54 reaches a desired temperature, which can be sensed by an aquastat or a thermostat, fluid can be withdrawn from fluid reservoir 54 and passed through the home heater system 60 to warm the interior of any suitable building structure. After passing through heaters 60 the fluid is reconveyed back into fluid reservoir 54 wherein it again is warmed by recirculation through the collector panels 58. In addition, the warmed heat absorption fluid in reservoir 54 can be circulated through chillers 62 and utilized in a home cooling system. The fact that temperatures within the range of 180° to 210° F. can be achieved with the solar heat collector system of this invention is significant because chilling units typically require hot water at temperatures in excess of 180° F. Thus, many prior art units could not be utilized for chilling units such as those utilizing lithium bromide solutions.

It is important to note that the solar heat collector system of this invention functions as a combination of flat plate heat absorption collection system and focal point reflector systems. Thus, the flat ellipse surface of pipes or conduits 20 will absorb solar energy and convert it to heat energy as do conventional collector plates; and the mirror reflecting surface of reflectors 16 will gather, focus and reflect solar rays to the absorption surface of the conduits 20.

What is claimed is:

1. A solar heat collector system comprising,
  in generally laminar construction,
  an exteriorly exposed transparent member,
  a focal point reflector plate spaced apart from and behind said transparent member to provide a space therebetween, said reflector plate comprising a material having a plurality of concave parabolic surfaces each of said surfaces being of a sunray reflective material, and
  a conduit for heat exchange fluid in said space of elliptical cross section positioned in said space forwardly of said concave parabolic surfaces to intercept solar rays reflected from each of said parabolic surfaces of said reflector plate, said conduit being comprised of a heat absorbing material, the elliptical cross section of said conduit having a major axis and a minor axis with said major axis being parallel to the chord formed by the extremities of the arc of each parabolic surface whereby the amount of direct sunlight impingement on said conduit is maximized, said major axis being of sufficient width such that said conduit will directly intercept all reflected rays from said parabolic surfaces of said focal point reflector plate.

2. The heat collector system of claim 1 wherein said reflector plate has mirror type reflecting surface.

3. The heat collector system of claim 1 wherein said conduit is of a serpentine configuration.

4. The heat collector system of claim 1 wherein said system is comprised of a plurality of modular units.

5. A building heating system comprising,
  the heat collector system of claim 1,
  a pump means,
  a fluid reservoir, and
  interior building heating units,
  said pump means being adapted to pump fluid from said reservoir through said system and back to said reservoir,
  said interior building heating units being adapted to receive heated fluid from said reservoir to provide heat to the interior of a building.

6. The building heating system of claim 5 wherein said fluid is water.

7. The building heating system of claim 5 wherein said fluid is a glycol heat exchange fluid.

8. The solar heat collector system of claim 1 wherein said conduit is of a dark, solar ray absorptive color.

* * * * *